United States Patent

Plessinger

[15] 3,647,015

[45] Mar. 7, 1972

[54] STEERING BAR BRAKE-ACTUATING DEVICE

[72] Inventor: John A. Plessinger, 1725 Wesleyan Road, Dayton, Ohio 45406

[22] Filed: Apr. 6, 1970

[21] Appl. No.: 25,711

[52] U.S. Cl. ............................... 180/27, 188/18, 188/72.9, 188/119
[51] Int. Cl. ......................................................... B60t 7/08
[58] Field of Search ..................... 280/88; 180/77, 25–27, 180/13; 188/119, 72.7, 72.9, 18

[56] References Cited

UNITED STATES PATENTS

| | | | |
|---|---|---|---|
| 1,717,384 | 6/1929 | Johnson | 280/88 |
| 1,894,160 | 1/1933 | Clark | 280/88 |
| 3,096,853 | 7/1963 | Farrand | 188/18 |
| 704,156 | 7/1902 | Weeber | 280/88 |
| 2,766,994 | 10/1956 | Ayers | 280/88 X |
| 3,089,560 | 5/1963 | Priest | 180/77 |
| 3,369,629 | 2/1968 | Weiss | 180/27 |
| 3,512,599 | 5/1970 | Hott et al. | 180/27 |

Primary Examiner—Kenneth H. Betts
Attorney—Joseph A. Brown, John C. Thompson, James J. Kennedy and George C. Bower

[57] ABSTRACT

A brake for a vehicle having a steerable single front wheel rotatively disposed beneath the front portions and a live axle transversely disposed about the rear portions with wheels mounted thereon. A disc brake is attached about the rear axle for braking the rotation thereof and is linked by a brake cable to a steering bar that is rotatively disposed about the front portions of the vehicle for steering the single front wheel. Furthermore the steering bar is pivotable about a horizontal axis such that the upward forward movement of the steering bar about the horizontal axis pulls the brake cable forward, thereby actuating the disc brake and braking the rotation of the live axle.

3 Claims, 4 Drawing Figures

PATENTED MAR 7 1972 3,647,015

INVENTOR
JOHN A. PLESSINGER

STEERING BAR BRAKE-ACTUATING DEVICE

The steering bar brake-actuating device of the present invention relates to and is shown in a concurrently filed patent application by Plessinger and Moore entitled "Recreational Vehicle" Ser. No. 25,816 filed Apr. 6, 1970.

BACKGROUND OF THE INVENTION

This invention relates to brake-actuating devices and more particularly to handlebar brake-actuating devices for vehicles.

In the past vehicles have employed mechanical brake-actuating means disposed about their handle bars. The most obvious type to come to mind is the compressive lever-type handbrake used on handlebars of bicycles and motorcycles. These have not been entirely satisfactory because, first, they are generally located to one side of the handlebar and can be operated only by one hand. In addition, the lever normally used is relatively short, thereby requiring substantial compressive force by the operator's hand to effectively brake the vehicle.

In addition, vehicles have been known to be equipped with front wheel pad brakes actuated by cam or linkage means. These types of braking arrangements are considered undesirable for the following reasons: (1) Any variation in the surface of the wheel whether it be structural or simply the presence of a foreign substance, causes uneven braking; (2) When travelling at moderate speeds the instant application of the front wheel pad brake tends to somersault the vehicle; and (3) The cam or linkage means is normally openly exposed to weather and terrain conditions which often results in the brake mechanism binding.

One object of the present invention is to overcome the disadvantages of the prior art.

Another object of the present invention is to provide a brake structure which overcomes the disadvantages of the prior art by uniformly applying a braking force to rear wheel means by a mechanism which gives good operator leverage and which is safe, reliable, and of a relatively low cost.

A further object of the present invention is to provide a vehicle that has a disc brake disposed about a live rear axle and linked by a brake cable to a steering bar that is pivotable about a horizontal axis such that when the bar is pushed upwardly and forwardly about the horizontal axis the brake cable is drawn forward which in turn mechanically compresses the disc brake and brakes the rotation of the rear wheels.

Other objects and advantages of the present invention will become apparent and obvious from a study of the following description and accompanying drawings.

Figure 1:
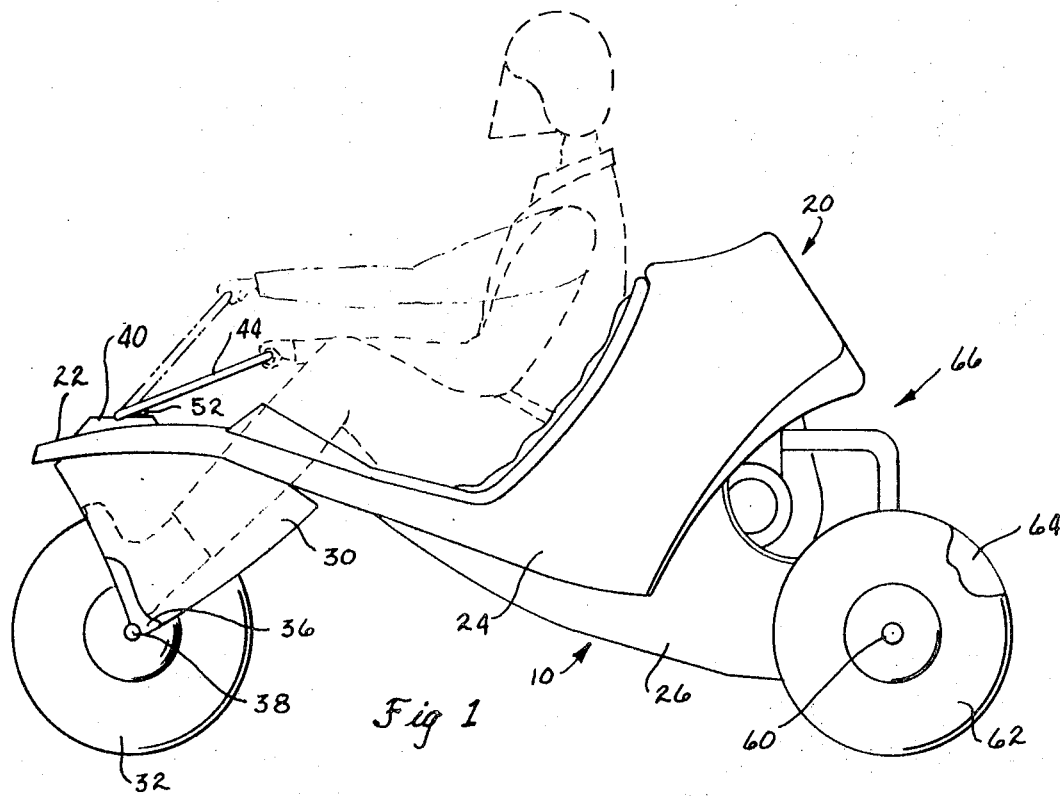
FIG. 1 is a side elevational view of the vehicle.

With reference to the drawings, particularly FIG. 1, a three-wheeled vehicle is indicated generally at 10. A body 20 extends the length of the vehicle 10 and comprises a narrowed front portion 22, an intermediate portion 24 and a rear portion 26. The general hulled L-shape of the intermediate portion 24 gives rise to the formation of a seat 28 therein.

Disposed beneath the front body portion 22 is a forked wheel housing 30 for supporting a single front wheel 32. The forked wheel housing 30 has a closed neck 34 formed about its upper portions and a stirrup 36 formed about each of its lower side portions. The closed neck 34 is fitted within a circular cut out of the front body portion 22 for rotation therein. The front wheel 32 is journaled about a shaft 38 for rotation thereabouts. The shaft 38 is fixedly mounted transversely to the forked wheel housing 30 at points just beneath the stirrups 36.

Figures 3, 4:
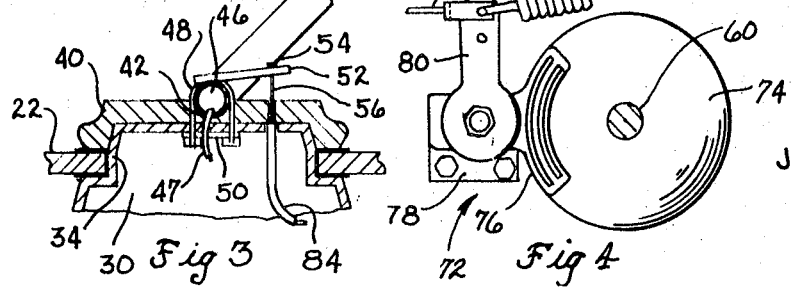
FIG. 3 is an enlarged fragmentary sectional view of the steering and brake-actuating mechanism.
FIG. 4 is an enlarged side elevational view of the disc brake.

Turning to FIG. 3, it can be seen that the closed neck 34 extends just above the level of the front body portion 22. A support member 40 is flushly capped over the top of the upward extending closed neck 34 for rotation therewith. The support member 40 has a half-tube recess 42 formed about its top and extending thereacross for receiving a tubelike member. A steering bar 44 of tubular shape has a base 46 which is rotatively secured in the recess 42 by a pair of spaced U-bolts 48. The U-bolts 48 overlap the base 46 and extend down through the support member 40 and on through the forked wheel housing 30 where a bracket 50 is bolted to each. This securing arrangement assures corresponding rotation between the steering bar 44, the support member 40, and the forked housing 30.

Located about the upper handle portion of steering bar 44 is a thumb-actuated kill button 45 having a lead 47 extending therefrom to the engine 66. Mounted adjacent to the kill button 45 is a throttle, not shown, for throttling the engine 66.

A plate 52 is welded at its forward end to the upper portion of base 46. The free end extends rearwardly and contains a key hole 54 for receiving the forward end of a brake cable 56. At the point of weld, the sides of plate 52 butt against or nearly butt against the inner surfaces of the spaced U-bolts 48. Thus, the base 46 is secure and not free to slip or move laterally about the recess 42.

With reference to the back of the vehicle 10, the rear is supported by a live axle 60 journaled transversely through the rear body portion 26 and having a pair of wheels 62, 64 mounted to each end thereof.

An engine 66 is mounted into the rear body portions 26 and has a main drive 68 which drives an intermediate drive 70. The intermediate drive 70 drives a sprocket, not shown, that is fixed to the axle 60.

A conventional double-actuating disc brake is indicated generally at 72, and is shown particularly in FIG. 4. It includes a disc 74 fixedly mounted intermediately about the axle 60. Forwardly of the disc 74 is a mounting bracket 78 which is secured to the body 20. A pair of corresponding spaced calipers consisting of a first caliper 76 and a second caliper, not shown, is spring biased about the mounting bracket 78 and extend rearwardly therefrom. The mounting bracket 78 is so positioned that a portion of the disc 74 is sandwiched between the calipers.

A cam arm 80 is fixed outwardly adjacent the first caliper 76 and extends upwardly therefrom. Disposed between the cam arm 80 and the first caliper 76 is a double cam arrangement, not shown. As the cam arm 80 is pivoted the double cam arrangement compresses the calipers inwardly toward each other, thereby engaging the disc 74.

The cam arm 80 is connected about its upper portion by a brake cable 56 which extends forwardly therefrom. The cam arm 80 is furtherly spring biased rearwardly by a coil spring 82 which is secured to the body 20.

The brake cable 56 extends forwardly from the cam arm 80 up through openings in the forked housing 30 and support member 40 and fits into the key hole 54 of plate 52. A cable housing 84 which houses the brake cable 56 extends forwardly from just beyond the cam arm 80 up through the forked housing 30 and its forward end is recessed about the lower edge of the support member 40. The cable housing 84 is secured to the body 10 by a cable bracket 86.

Figure 2:
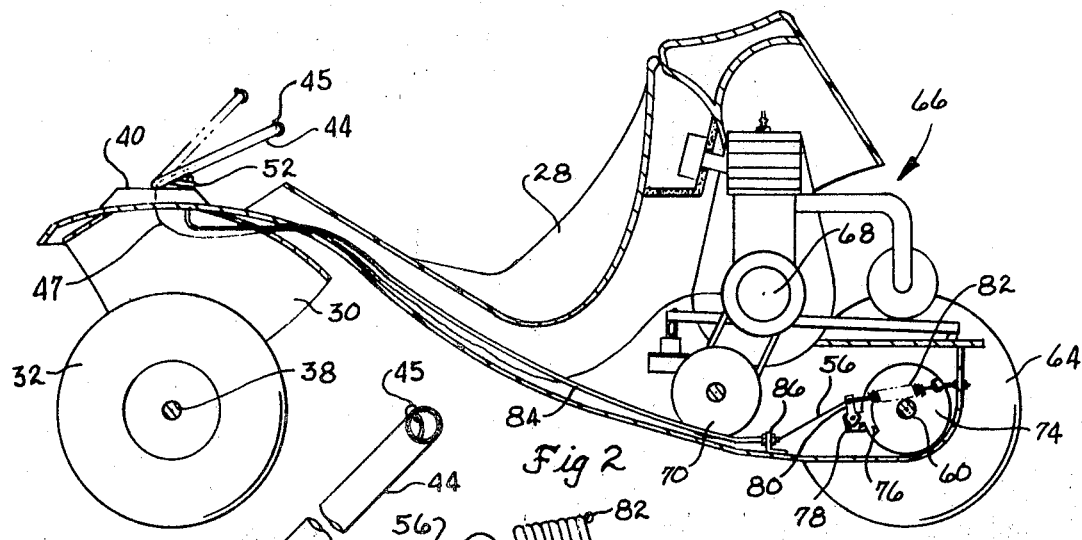
FIG. 2 is a sectional side elevational view of the vehicle.

In the normal mode of operation the disc brake 72 is open and the steering bar 44 is in its nonbraking position which will be referred to as a first position. The cam arm 80 is so arranged that it extends upwardly in a neutral position when the disc brake 72 is open. The steering bar 44 in the first position extends generally rearwardly and upwardly toward an operator. Referring to FIGS. 1 and 2, it can be seen that the first position of the steering bar 44 is established by the contact of plate 52 with the upper surface of support member 40.

In braking the vehicle, the operator pushes the steering bar 44 upwardly and forwardly about the horizontal axis of base 46 into a second position. Since the plate 52 is fixed to the steering bar 44 it rotates upwardly and pulls the brake cable 56 forwardly which pivots the cam arm 80 counterclockwise out of its neutral position causing the calipers to engage the disc 74. This second position or braking position is shown in dotted lines in FIGS. 1 and 2.

Once the vehicle 10 has halted the operator may manually pull the steering bar 44 from its second position back to its first position. This forces the brake cable 56 rearwardly and with the help of the coil spring 82 the cam arm 80 is pivoted clockwise to its neutral position, thereby disengaging the calipers from the disc 74. The coil spring 82 continues to exert some tension on the cam arm 80 even while in the neutral position, but any further clockwise movement is prohibited by the engagement of the plate 52 with the upper surface of support member 44.

In shifting the brake cable 56 back and forth the cable housing 84 has a tendency to move therewith. By recessing the forward end of the cable housing 84 into the inner surface of support member 44 and clamping the rear end by a bracket 86 the housing is bound to a stationary position.

The present invention may be carried out in other specific ways than those herein set forth without departing from the spirit and essential characteristics of the invention. The present embodiments are, therefore, to be considered in all respects as illustrative and not restrictive and all changes coming within the meaning and equivalency range are intended to be embraced herein.

Having thus described our invention, what we claim is:

1. A steering bar brake-actuating device for a vehicle comprising in combination: a frame structure; a forked wheel housing rotatively mounted about a vertical axis within a forward portion of said frame structure; a front wheel rotatively mounted about a first horizontal axis within said forked wheel housing; a combination steering and braking bar operatively connected to said forked housing, said steering and braking bar being pivotally mounted about a second horizontal axis for movement thereabouts relative to said forked housing, said second horizontal axis being fixed relative to said forked housing wherein said steering and braking bar is operative to rotate said forked housing about said vertical axis for steering, and wherein said steering and braking bar is pivotal about said second horizontal axis independently of said forked housing; a rear wheel assembly rotatively mounted transversely about the lower rear portion of said frame, said rear wheel assembly including a pair of wheels mounted on a live axle; a brake assembly operatively associated with said rear wheel assembly, said brake assembly including a disc fixed to said live axle and rotatable therewith and a pair of caliper brakes mounted about said disc such that a portion thereof is sandwiched between said calipers; and a linkage operatively interconnecting said brake assembly with said steering and braking bar such that the braking assembly is actuated by the pivotal movement of said steering and braking bar about said vertical axis which also acts to steer said front forked housing without actuating said brake assembly.

2. A steering bar brake-actuating device, as recited in claim 1, wherein said interconnecting linkage includes a cable assembly.

3. A steering bar brake-actuating device, as recited in claim 1, wherein a support member is interposed between said forked wheel housing and said steering bar, and wherein connecting means extend through said support member connecting said steering bar with said forked wheel housing.

* * * * *